US010052816B2

(12) United States Patent
Sigrist et al.

(10) Patent No.: US 10,052,816 B2
(45) Date of Patent: Aug. 21, 2018

(54) WELDING APPARATUS

(71) Applicant: Leister Technologies AG, Kägiswil (CH)

(72) Inventors: Flavio Sigrist, Sachseln (CH); Marco Wildi, Kerns (CH)

(73) Assignee: Leister Technologies AG, Kaegiswil (CH)

( * ) Notice: Subject to any disclaimer, the term of this patent is extended or adjusted under 35 U.S.C. 154(b) by 0 days.

(21) Appl. No.: 15/436,823

(22) Filed: Feb. 19, 2017

(65) Prior Publication Data
US 2017/0274578 A1   Sep. 28, 2017

(30) Foreign Application Priority Data
Mar. 24, 2016  (CH) ................................ 16401022.5

(51) Int. Cl.
| B29C 65/20 | (2006.01) |
| B29C 65/30 | (2006.01) |
| B29C 65/78 | (2006.01) |
| B29C 65/00 | (2006.01) |

(52) U.S. Cl.
CPC .............. B29C 65/20 (2013.01); B29C 65/30 (2013.01); B29C 65/7841 (2013.01); B29C 66/83 (2013.01); B29C 66/83413 (2013.01); B29C 66/86523 (2013.01); *B29C 66/8161* (2013.01); *B29C 66/8221* (2013.01); *B29C 66/8362* (2013.01)

(58) Field of Classification Search
CPC ... B29C 65/20; B29C 66/814; B29C 66/8161; B29C 66/8362; B29C 66/86523; B29C 66/86535
See application file for complete search history.

(56) References Cited

U.S. PATENT DOCUMENTS

| 4,146,419 A | * | 3/1979 | Neidhart | ............. | B29C 66/1122 |
| | | | | | 156/391 |
| 4,872,941 A | * | 10/1989 | Lippman | ................. | B29C 65/10 |
| | | | | | 156/497 |

(Continued)

FOREIGN PATENT DOCUMENTS

| DE | 2700971 A1 * | 8/1977 | ............. B29C 65/82 |
| DE | 7700687 U1 | 3/1981 | |

(Continued)

*Primary Examiner* — Mark A Osele
(74) *Attorney, Agent, or Firm* — Von Rohrscheidt Patents

(57) ABSTRACT

A welding apparatus for welding overlapping plastic material webs along edges of the overlapping plastic material webs, the welding apparatus including a chassis; and a heating device arranged at the chassis and configured for melting the edges of the overlapping plastic material webs, wherein the chassis includes a support frame which includes at least two running rollers that are arranged offset from each other, at least two pressing and feed rollers that are arranged opposite to each other, wherein a lower pressing and feed roller of the at least two running and feed rollers is fixated at the support frame and an upper pressing and feed roller of the at least two running and feed rollers is pivotably supported at the support frame, and at least one drive unit with a transmission, wherein the at least two running rollers are configured for supporting the chassis on a base.

13 Claims, 5 Drawing Sheets

(56) References Cited

U.S. PATENT DOCUMENTS

| | | | | |
|---|---|---|---|---|
| 4,923,558 | A * | 5/1990 | Ellenberger | B29C 66/1122 100/171 |
| 5,865,942 | A * | 2/1999 | Sinclair | B29C 66/1122 156/499 |
| 5,873,965 | A * | 2/1999 | Greller | B29C 66/1122 156/358 |
| 6,050,317 | A * | 4/2000 | Weissfloch | B29C 66/1122 156/499 |
| 6,186,210 | B1 * | 2/2001 | Gehde | B29C 65/10 156/499 |
| 2004/0011472 | A1 * | 1/2004 | Zurmuhle | B29C 65/10 156/502 |
| 2015/0239173 | A1 * | 8/2015 | Gisler | B32B 37/0046 156/583.1 |
| 2017/0239882 | A1 * | 8/2017 | Niederberger | B29C 66/83413 |

FOREIGN PATENT DOCUMENTS

| | | |
|---|---|---|
| DE | 8805783 U1 | 6/1988 |
| DE | 3837869 C1 | 3/1990 |
| DE | 29719434 U1 | 2/1998 |
| DE | 29719436 U1 | 2/1998 |
| FR | 2572997 A1 | 5/1986 |
| JP | 2001121612 A | 5/2001 |

* cited by examiner

WELDING APPARATUS

RELATED APPLICATIONS

This application claims priority from and incorporates by reference European Patent Application EP 16 401 022.5 filed on Mar. 24, 2016.

FIELD OF THE INVENTION

The invention relates to a welding apparatus for welding overlapping plastic material webs at edges of the plastic material webs, the apparatus including a heating device arranged at a chassis and configured to melt the plastic material webs at their edges, the chassis including a support frame including at least two running rollers that are offset from each other, at least two pressing and feed rollers arranged opposite to each other wherein a respective lower feed roller is fixated in place and a second upper feed roller is pivotably supported and at least one drive unit with transmission, wherein the running rollers are provided for supporting on a base and the pressing and feed rollers are provided for passing an edge of the overlapping plastic material webs through and the drive unit and the transmission is provided for driving the pressing and feed rollers.

BACKGROUND OF THE INVENTION

Welding apparatuses of this general type are known in the art and are used for welding foils, tarps and other flat materials made from plastic. Thus, the plastic webs are plasticized by introducing heat into an overlap portion of their edges and are subsequently compressed under pressure.

The patent application EP 1 900 501 A1 discloses a welding apparatus for connecting laterally overlapping gasket webs along their edges. The welding apparatus includes a frame that is displaceable by running rollers and a heating device supported by a support frame of the chassis and configured to melt the plastic webs that are to be welded. The plastic webs are pressed together by compression and feed rollers that are supported at the support frame and driven by a drive unit that includes at least one motor and at least one transmission. Additionally devices for moving the at least one upper pressing and feed roller relative to the lower fixated pressing and feed roller are provided which include a tensioning device for the at least one pivotably supported upper pressing and feed roller. Thus, for example during overlapping welding of plastic webs the individual webs have to be arranged overlapping at an intended seam and fixated. Furthermore the provided heating device has to be inserted between the edges of the webs that are to be welded together and a joining pressure has to be applied. Thus, replacing the pressing and feed rollers is required quite frequently depending on a desired seam geometry and a degree of contamination of the running surface. This replacement is often made more difficult by the heating device which is arranged proximal to the pressing and feed rollers.

In the field of the invention reference is also made to the printed documents DE 297 19 434 U1, DE 297 19 436 U1 and DE 77 00 687 U1.

DE 297 19 434 U1 discloses a welding apparatus for overlapping welding of foil edges, the welding apparatus including a heating element over whose heating surfaces the foil edges can be run in order to provide classification, wherein the heating element is suspended freely movable, essentially movable in a spring elastic manner perpendicular to the heating surfaces of the heating element, wherein the heating element is suspended at least at one leaf spring arm which extends essentially in a direction of the provided movement direction of the foil edges so that the heating element is pivotable about a parallel axis that is oriented transversal to and intended movement direction of the foil edges. Thus, the heating element is in particular suspended in a spring elastic manner so that it is already arranged in a substantially optimum position for feeding the foil edges when the heating element is not under load so that the at least one leaf spring extends essentially horizontally with its flat sides. The self-acting optimum adaptation is then provided based on the contact pressure of the foil edges against the effect of the spring which is rather weak. By the same token the at least one leaf spring is clamped at the feed side and extends to the output side wherein the heating element is supported at a free end of the leaf spring.

DE 297 19 436 U1 teaches a welding apparatus for overlapping welding of foil edges including pressing rollers for compressing the foil edges after heating wherein the pressing rollers are supported on axles wherein at least one axle is movably supported relative to the other axle and vice versa, wherein at least one of the axles is alignable by an alignment device parallel to the other axle and fixable in this position and the alignment device is in particular associated with the movably supported axle. Thus, the axle is supported at two pivot arms wherein the alignment device connects the two pivot arms and forms a bridge between the pivot arms which is disengageably attached at one of the pivot arms so that the attachment is adjustable.

DE 77 00 687 U1 proposes a device for continuously welding webs made from a thermoplastic plastic material that overlap at an edge, wherein the device includes a support for spacing and joining of the web edges to be welded and a heating device for plasticizing the web edges wherein the heating device is supported protruding from a longitudinal side of a housing between the web edges that are supported at a distance from each other and wherein a pressing roller pair is arranged at a longitudinal side of the housing downstream of the heating device, wherein a pressing roller is supported rigid and another pressing roller is supported so that it is displaceable against the spring force, and wherein the heating device is configured as a contact welding skid and advantageously configured as a heating wedge and forms a portion of the support device. Thus, the upper pressing rollers are attached at an upper frame so that they are pivotable independently from each other and so that they are pressable onto the welding material by a common spring. Additional pressure rollers are arranged in front of the pressure rollers on both sides of the contact welding skid in order to press the webs to be welded onto the wedge shaped contact heating element, wherein the contact pressure is advantageously applied by leaf springs and the contact welding skid is configured as a heating wedge that is supported about two pivot axes.

BRIEF SUMMARY OF THE INVENTION

Improving upon the art described supra it is an object of the invention to propose an option that facilitates replacing the pressing and feed rollers in that the attachment of the heating device is simplified and thus facilitates a simple position change relative to the pressing and feed rollers. Thus, the attachment of the heating device at the support frame shall be mechanically simple and economical.

The object is achieved according to the invention by a welding apparatus for welding overlapping plastic material webs along edges of the overlapping plastic material webs, the welding apparatus including a chassis; and a heating device arranged at the chassis and configured for melting the edges of the overlapping plastic material webs, wherein the chassis includes a support frame which includes at least two running rollers that are arranged offset from each other, at least two pressing and feed rollers that are arranged opposite to each other, wherein a lower pressing and feed roller of the at least two pressing and feed rollers is fixated at the support frame and an upper pressing and feed roller of the at least two pressing and feed rollers is pivotably supported at the support frame, and at least one drive unit with a transmission, wherein the at least two running rollers are configured for supporting the chassis on a base, wherein the upper pressing and feed roller and the lower pressing and feed roller are configured for passing the edges of the overlapping plastic material webs through between each other, and wherein the drive unit with the transmission is configured for driving the at least two pressing and feed rollers, wherein a longitudinal bending arm is arranged at the support frame and protrudes in a welding direction from the support frame, wherein the longitudinal bending arm is elastically deformable at least in a direction that is vertical in an operating position of the welding apparatus, wherein the longitudinal bending arm is fixated at the support frame with an end of the longitudinal bending arm that is oriented backward in a welding direction, and wherein the heating device is fixated with a heating device section that is oriented backward in the welding direction at an end of the longitudinal bending arm that is oriented forward in the welding direction. Other advantageous embodiments can be derived from the dependent claims.

Accordingly the heating device is arranged at a longitudinal bending arm of the support frame of the chassis of the welding apparatus wherein the longitudinal bending arm protrudes in the welding direction from the support frame and is elastically deformable at least in a direction that is vertical in an operating position of the welding apparatus and wherein the longitudinal bending arm is connected in a rigid manner with the support frame at an end of the longitudinal bending arm that is behind in the welding direction and wherein the heating device is attached in a non-moveable manner with a heating device section that is behind in the welding direction at an end of the longitudinal bending arm that is in front in the welding direction. According to the invention the longitudinal bending arm extends in a non-deformed condition relative to a driving plane defined by the driving rollers at an acute upward angle. Thus, no external force impacts the longitudinal bending arm. The longitudinal bending arm can extend in a linear, cambered or kinked manner. The heating device that is arranged at the forward end of the longitudinal bending arm end is arranged without force impact upon the longitudinal bending arm remote from the at least one lower locally fixated pressing and feed roller and additionally advantageously is also arranged at a distance from the upper pivotably supported pressing and feed roller. A distance from the at least one lower and upper pressing and feed roller can therefore be chosen at will. The welding direction is thus defined relative to the welding apparatus and thus oriented opposite to the typical running direction of the welding apparatus.

The longitudinal bending arm is thus elastically vertically deformable and defines a different position of the heating device relative to the pressing and feed rollers and relative to the running rollers as a function of a bending of the longitudinal bending arm. This facilitates in a simple manner to pivot the heating device away from the pressing and feed rollers or towards the pressing and feed rollers by imparting a force upon the forward end of the longitudinal bending arm. The pivot movement of the elastically deformable longitudinal bending arm can thus be defined by the provided end stops or defined by suitable actuation devices, for example an actuation lever.

Thus, the heating device extends the longitudinal bending arm in the welding direction in an advantageous embodiment of the invention. Advantageously the heating device is a heating wedge, advantageously an electric heating wedge. Thus, the heating device can be for example a contact heating device or a hot air nozzle.

Advantageously the heating device is pivotable together with the at least one upper pivotable pressing and feed roller in and against a direction of the at least one lower fixated pressing and feed roller.

Thus, in an advantageous embodiment of the welding apparatus according to the invention an actuation device for the longitudinal bending arm with the heating device is arranged at the support frame wherein the actuation device facilitates bending the forward longitudinal bending arm end downward, this means vertically in the operating position of the welding apparatus wherein the actuation device impacts the longitudinal bending arm directly through an actuation lever or the actuation device impacts the longitudinal bending arm indirectly through the heating device. The actuation lever is pivotably arranged at the support frame. Through the force impact upon the actuation lever the heating device is moved in a direction towards the at least one lower fixated pressing and feed roller and thus the longitudinal bending arm is loaded. When moving the actuation lever in an opposite direction the longitudinal bending arm is unloaded so that it relaxes automatically and thus moves the heating device away from the at least one lower fixated pressing and feed roller.

In an advantageous embodiment of the invention a tensioning device for the at least one pivotably supported upper pressing and feed roller is arranged at the support frame wherein the tensioning device is coupled with the actuation device for the longitudinal bending arm and the tensioning device presses the at least one upper pivotable pressing and feed roller against the at least one fixated lower pressing and feed roller. This for example facilitates changing the pressing and feed rollers and introducing the heating device between the two edges of the plastic material webs to be welded and inserting the heating device between the at least two pressing and feed rollers that are arranged opposite to each other since opening the pressing and feed rollers simultaneously pivots the heating device.

In one embodiment of the invention the actuation lever includes at least one down holder bar for the longitudinal bending arm wherein the down holder bar laterally protrudes from the longitudinal bending arm and impacts the heating device and/or the longitudinal bending arm when the actuation device is actuated and thus brings the heating device into the welding position in that it bends the longitudinal bending arm vertically downward in the operating position of the welding apparatus and thus loads the longitudinal bending arm with tension. Thus in one of the advantageous embodiments of the welding apparatus according to the invention the at least one down holder bar keeps the edge of the overlapping plastic material web away from the heating device when the pressing and fed rollers are separated from each other. Furthermore the heating device lifts off from the overlapping plastic material web when the pressing and feed rollers are separated from each other. Thus, before and after the welding process and during a brief interruption of the welding process an undesirable classification of the overlapping edges of the plastic material web is reliably prevented. The down holder bar which advantageously protrudes laterally from the actuation lever at a bottom side reaches at least partially over the longitudinal bending arm and/or the heating device. The down holder bar is advantageously configured adjustable relative to the actuation lever. The down holder bar is used in particular for welding thin plastic material webs, this means plastic foils.

In another embodiment of the welding apparatus according to the invention the actuation lever includes at least one down holder roller for the longitudinal bending arm which down holder roller impacts the heating device when the actuation device is actuated and thus bends the longitudinal bending arm vertically downward in the operating position of the welding apparatus. Thus, in an advantageous embodiment of the invention the at least one down holder roller presses the edge of the plastic material web onto the heating device when the overlapping plastic material web is supported between the pressing and feed rollers and the pressing and feed rollers are in contact with each other. The down holder roller thus cannot keep the edge of the overlapping plastic material web away from the heating device when the pressing and feed rollers are separated from each other. Thus, the heating device upon a brief interruption of the welding process continues to heat the edge of the overlapping plastic material web so that this solution is only suitable for thin plastic material webs. The at least one down holder roller is configured adjustable relative to the actuation lever similar to the down holder bar.

Advantageously the heating device is arrangeable in a center between the two opposite pressing and feed rollers by bending the longitudinal bending arm downward in the operating position of the welding apparatus, wherein the heating device centers automatically self-acting. Adjusting the heating device relative to the at least two opposite pressing and feed rollers is not necessary. This simplifies using the welding apparatus according to the invention and thus shortens the time required to set up the welding apparatus.

In an advantageous embodiment of the invention the longitudinal bending arm is made from a spring elastic sheet metal blank. The spring elastic sheet metal blank has a thickness of 0.3-3.0 mm. Thus a width of the longitudinal bending arm is advantageously configured as a function of a length of the longitudinal bending arm. For a sufficient stability of the longitudinal bending arm its width is advantageously also configured greater with an increasing length of the longitudinal bending arm.

BRIEF DESCRIPTION OF THE DRAWINGS

Subsequently the invention described in more detail with reference to an embodiment illustrated in the drawing figure. Additional features of the invention can be derived from the subsequent description of the embodiment of the invention in combination with the patent claims and the appended drawing figure. The individual features of the invention can be implemented by themselves or in combination in different embodiments of the invention, wherein:

DETAILED DESCRIPTION OF THE INVENTION

Figure 1:
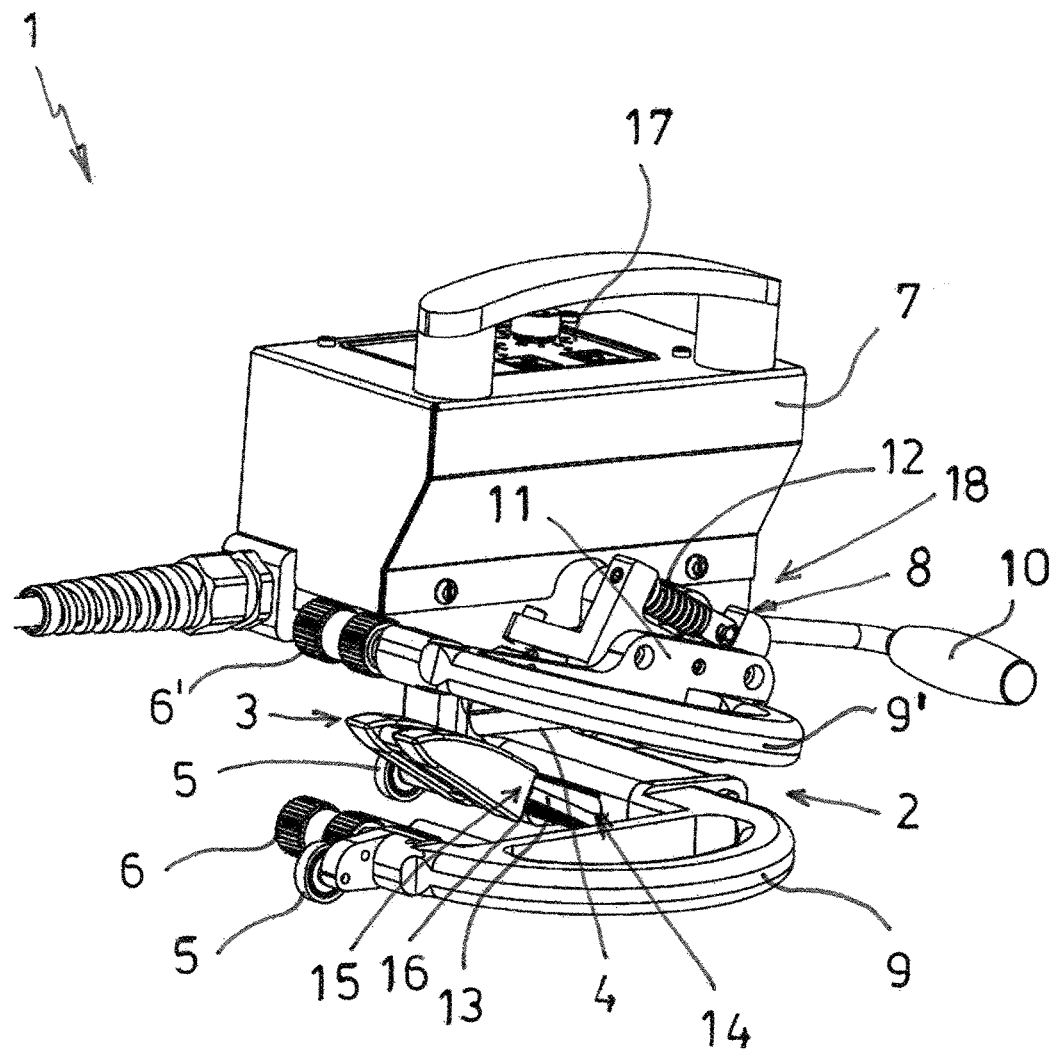
FIG. 1 illustrates a welding apparatus according to the invention with opposite pressing and feed rollers in an open position in a perspective view.

FIG. 1 illustrates a welding apparatus 1 according to the invention for overlapping edge welding of thermoplastic plastic material webs that are not illustrated in the drawing figure. The welding apparatus includes a chassis 2 with a heating device 3 arranged thereon for edge melting of the plastic material webs wherein the chassis 2 includes a support frame 4 at which three running rollers 5 that are offset from each other and two pressing and feed rollers 6, 6' that are arranged opposite to each other are arranged, wherein respectively the lower pressing and feed rollers 6 are fixated in place and the other upper pressing and feed rollers 6' are pivotably supported. The welding apparatus 1 furthermore includes a drive that is only partially visible in the drawing figure wherein the drive includes at least one drive unit with a transmission 20. The running rollers 5 are configured for ground support. The drive and feed rollers 6, 6' are configured for passing an edge of the overlapping plastic material webs through and the drive is configured for driving the pressing and feed rollers 6, 6'.

The illustrated welding apparatus 1 is an exemplary embodiment of the invention where the drive and feed rollers 6 or 6' are respectively driven by a flexible shaft that is not shown. The support frame 4 of the welding apparatus 1 is movably supported by three running rollers 5 and furthermore supports a housing 7 in which the drive that is not shown in the drawing is at least partially received. On the support frame 4 a tensioning device 8 for the pressing and feed rollers 6, 6' is arranged in addition to the housing 7 wherein the tensioning device includes two lateral bending stiff transversal arms 9, 9'. The lower transversal arm 9 is connected in a rigid manner with the support frame 4, whereas the upper transversal arm 9' is pivot ably arranged at the support frame 4. The transversal arm 9' that is pivot ably arranged at the support frame 4 is pivotable relative to the transversal arm 9 that is fixated at the support frame 4. The two transversal arms 9, 9' of the tensioning device 8 respectively support a pressing and feed roller 6, 6' at their free end. The transversal arms 9, 9' are hollow in this exemplary embodiment and include a respective non illustrated flexible shaft in their interior for driving the pressing and feed rollers 6, 6', wherein the respective flexible shaft extends from the drive.

Pivoting the pivotable upper transversal arm 9' closes a gap between the pressing and feed rollers 6 or 6' for the welding process and clamps the plastic material webs arranged there between for the welding process. Pivoting the pivotable transversal arm 9' is performed by an actuation handle 10 that is linked at the support frame 4. The actuation handle 10 is arranged at a support element 11, wherein flipping the actuation handle 10 moves the welding device from a position where the opposing pressing and feed rollers 6 or 6' are separated from each other into a position where the opposing pressing and feed rollers 6, 6' contact each other. Upon actuation of the actuation handle 10 a load spring 12 is compressed in this exemplary embodiment and a respective spring force is built up which generates the necessary clamping force between the opposite pressing and feed rollers 6, 6'.

Figure 5:
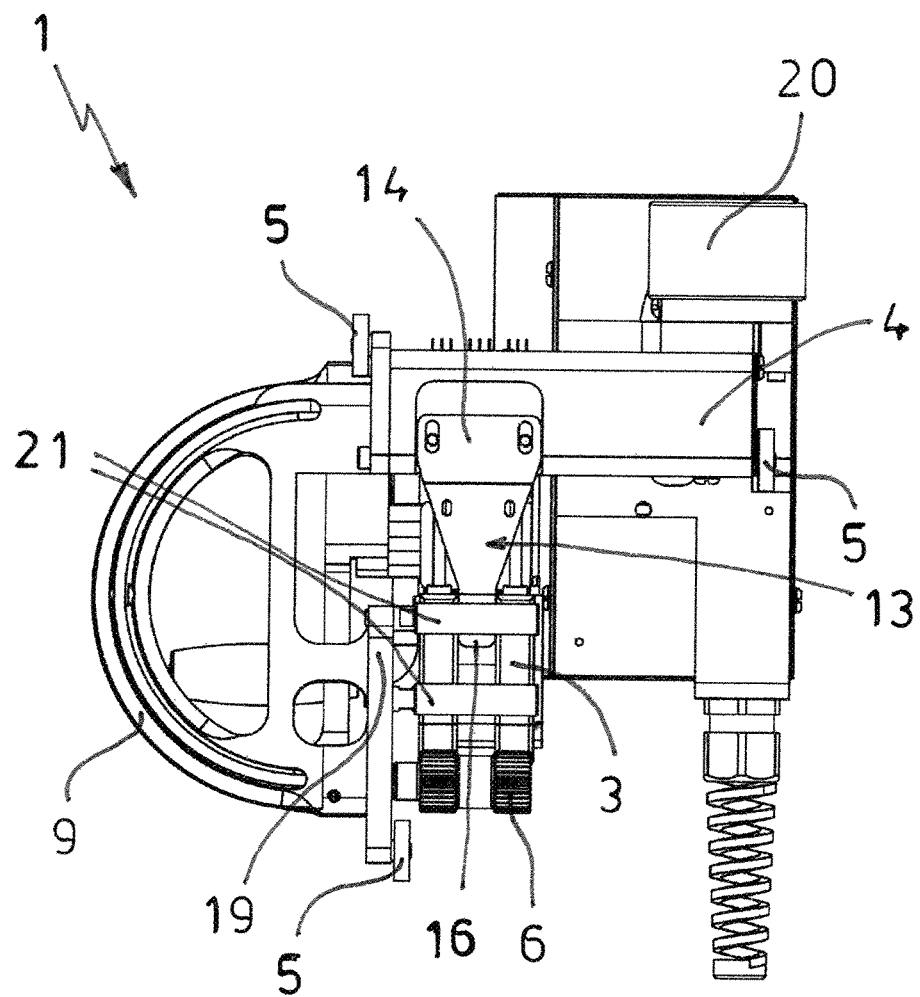
FIG. 5 illustrates the welding apparatus according to FIG. 3 in a bottom up view of the chassis with the longitudinal bending arm and the heating device in side view.

In the illustrated embodiment the heating device 3 is configured as a heating wedge. The heating device 3 is arranged at a longitudinal bending arm 13 of the support frame 4 which extends in the welding direction from the support frame 4. The longitudinal bending arm 13 is elastically deformable at least in a direction that is vertical in the operating position of the welding apparatus 1 and fixated at the support frame 4 with the an arm end 14 that is in a rear in the welding direction. As illustrated in FIG. 5 the heating device 3 is fixated with its heating device section 15 that is in the rear in the welding direction at an arm 16 of the longitudinal bending arm 13 that is in front in the welding direction. The heating device 3 extends the longitudinal bending arm 13 in the welding direction and is advantageously bolted to the forward arm end 16 in a disengageable manner. The longitudinal bending arm 13 is in turn bolted with its rear arm end 14 at the support frame 4.

Figure 2:
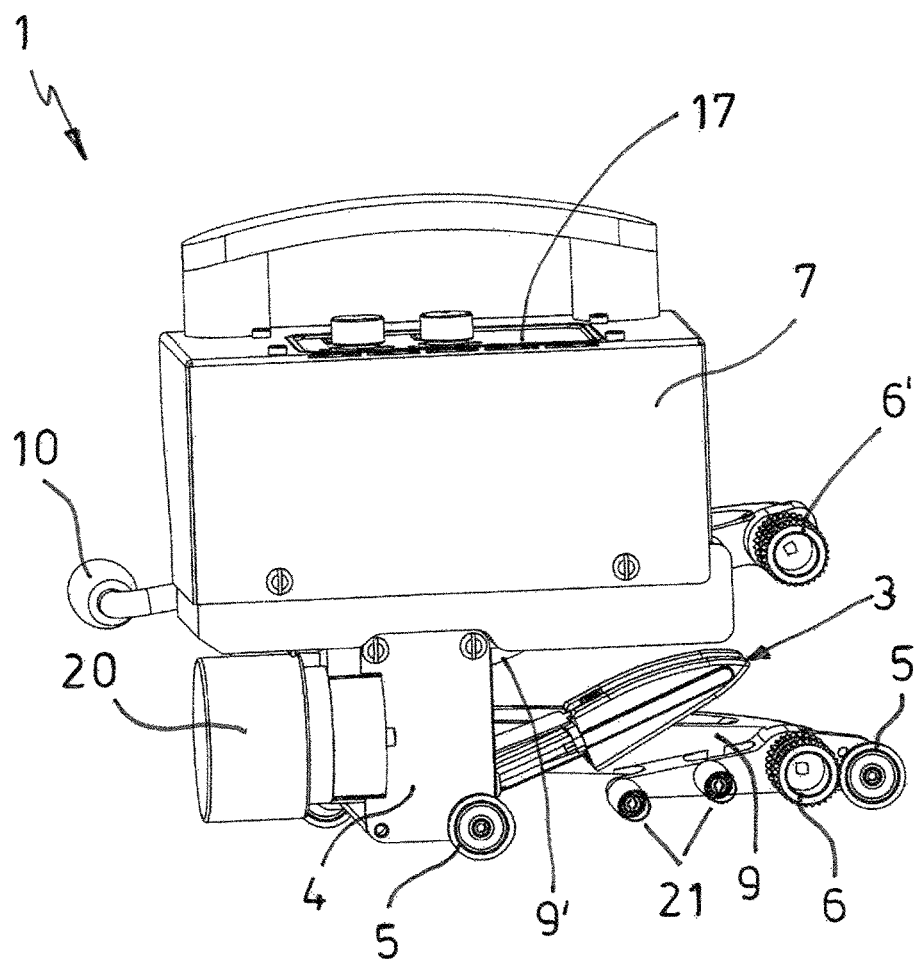
FIG. 2 illustrates the welding apparatus of FIG. 1 showing the heating device and the pressing and feed rollers in an open position in a side view.

As can be derived from FIGS. 1 and 2 the longitudinal bending arm 13 extends in a non-deformed condition in a straight line from the support frame 4 to the heating device 3. In the illustrated non-deformed condition the longitudinal bending arm 13 extends upward at an acute angle relative to a running plane defined by the running rollers 5. In this condition the longitudinal bending arm 13 is arranged with an upward slope at the chassis 2 so that the heating device 3 has a distance of a few centimeters from the lower or upper pressing and feed rollers 6, 6'. Additionally an electrical control 17 for the drive unit with the transmission 20 is arranged in the housing 7 of the welding apparatus 1.

FIG. 2 illustrates the welding apparatus 1 of FIG. 1 looking at the heating device 3 and the pressing and feed rollers 6 or 6' in an open position in side view. In this view the upper pivotable transversal arm 9' is mostly covered by the housing 7 of the welding apparatus 1. Only the upper pivotably supported pressing and feed roller 6' is visible. At the visible lower transversal arm 9 where the running rollers 5 and the lower fixated pressing and feed roller 6 is arranged at least one running support roller 21 for the lower plastic material web that is not illustrated in the drawing is arranged in welding direction behind the lower fixated pressing and feed roller at a distance from the lower pressing and feed roller 6. The tensioning device 8 includes an actuation device 18 for the longitudinal bending arm 13 with the heating device 3 wherein the actuation device is arranged at the support frame 4 and covered by the housing 7 in the drawing figure. The actuation device is visible in FIGS. 1 and 5. The actuation device 18 facilitates bending the forward arm end 16 vertically downward wherein the actuation device 18 influences the longitudinal bending arm 13 directly through the actuation lever 19 or indirectly through the heating device 3. The actuation lever 19 is advantageously coupled with the actuation handle 10.

Figure 3:
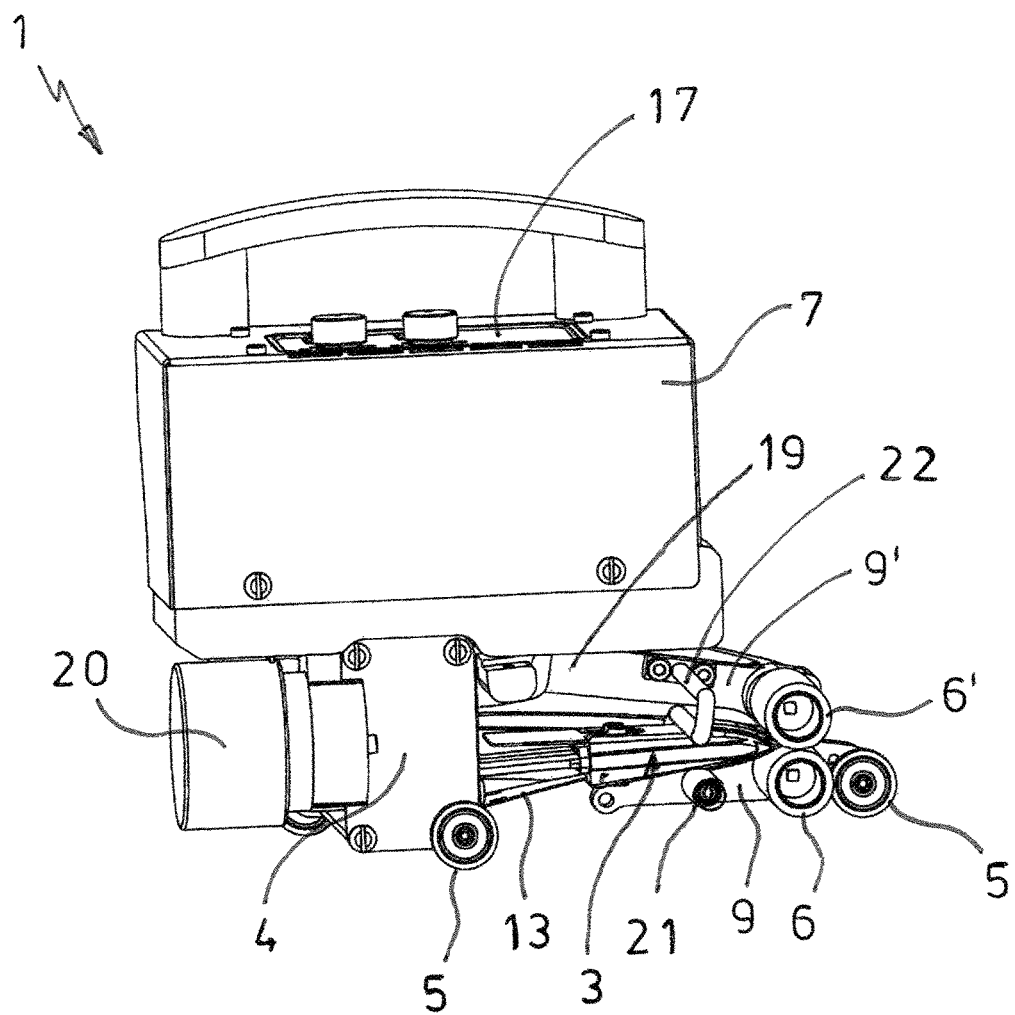
FIG. 3 illustrates the welding apparatus in FIG. 1 with a down holder bar showing the heating device and the pressing and feed rollers in a closed position and side view.
Figure 4:
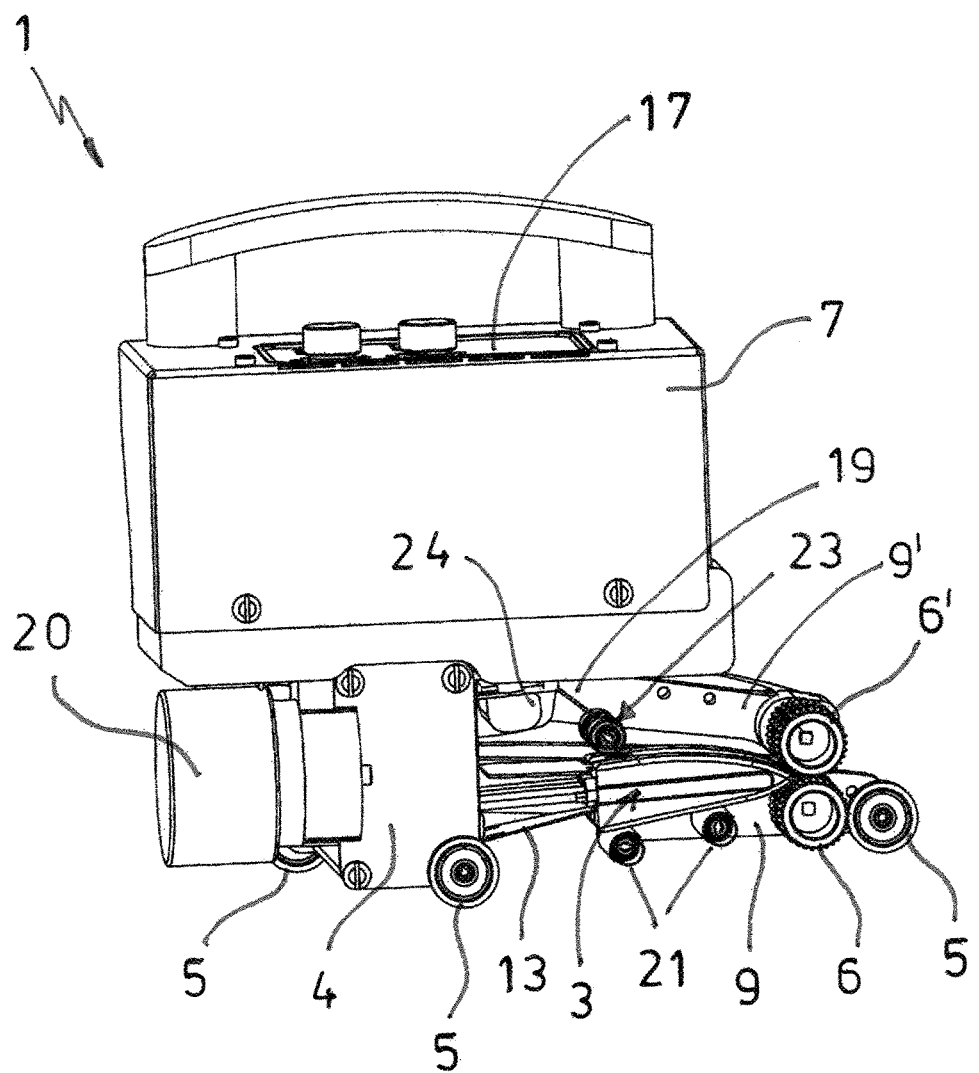
FIG. 4 illustrates the welding apparatus of FIG. 1 with a down holder roller showing the heating device and the pressing and feed rollers in a closed position in side view.

In a welding position of the welding apparatus 1 illustrated in subsequent FIGS. 3 and 4 where the pressing and feed rollers 6 or 6' contact each other an edge of the lower plastic material web is supported between the guide support rollers 21 and the heating device 3. In the illustrated open position of the tensioning device 8 the transversal arms 9, 9' extend at an acute angle relative to each other as illustrated in FIG. 1. The pressing and feed rollers 6, 6' are vertically offset from each other wherein the heating device 3 approximately has an identical distance from the pressing and feed roller 6 or 6' and thus extends approximately in a center between the feed rollers 6 or 6'.

FIG. 3 illustrates the welding apparatus 1 of FIG. 1 with a down holder bar 22 in a side view showing the heating device 3 and the pressing and feed roller 6, 6' in a closed condition. The down holder bar 22 protrudes laterally from the actuation lever 19 and contacts a top side of the heating device 3. Thus the down holder bar 22 presses the heating device 3 vertically downward in the closed position of the welding apparatus 1. The down holder bar is used in particular for thinner plastic material webs, this means plastic material foils which only require a very small amount of thermal contact.

FIG. 4 illustrates a variant of the welding apparatus 1 of FIG. 1 with a down holder roller 23 in a side view showing the heating device 3 and the pressing and feed rollers 6, 6' in a closed position. The down holder roller 23 is arranged at a lateral support arm 24 of the actuation lever 19. Thus, the down holder roller 22 presses the heating device 3 vertically downward in the closed position of the welding apparatus 1 and presses the heating device against the two guide support rollers. Thus, the down holder roller 22 also presses an edge of the upper and lower plastic material webs that are not illustrated in the drawing against the heating device. The down holder roller 22 is used in particular for thicker plastic material webs, this means plastic material foils which require good thermal contacting.

FIG. 5 illustrates the welding apparatus according to FIG. 3 from below showing the chassis 2 with the longitudinal bending arm 13 and the heating device 3 in a side view. The longitudinal bending arm 13 where the heating device 3 is arranged at a forward arm end 16 is attached at the chassis 2 with its rear arm 14 at the support frame 4. The longitudinal bending arm 13 is bolted together with the support frame 4 as well as with the heating device 3. Thus, the heating device 3 can be disengaged from the arm 13 easily when the heating device has to be cleaned or replaced. The longitudinal bending arm 13 is advantageously made from a spring elastic sheet metal blank. The sheet metal blank typically has a thickness of 0.3-3 mm. Thus, a width of the longitudinal bending arm 13 is selected so that the longitudinal bending arm 13 is stiff against bending in the horizontal direction in an operating position of the welding apparatus. Furthermore the lower non-movable transversal arm 9 of the tensioning device 8 is visible quite well in this figure wherein the lower non-moveable transversal arm 9 carries the lower pressing and feed roller 6. The lower pressing and feed roller 6 is arranged in alignment with the heating device 3. This also applies for the upper pivotable pressing and feed roller 6'. In this illustration also the three running rollers 5 of the chassis 2 are visible quite well.

What is claimed is:

1. A welding apparatus for welding overlapping plastic material webs along edges of the overlapping plastic material webs, the welding apparatus comprising:
   a chassis; and
   a heating device arranged at the chassis and configured for melting the edges of the overlapping plastic material webs,
   wherein the chassis includes a support frame which includes
   at least two running rollers that are arranged offset from each other,
   at least two pressing and feed rollers that are arranged opposite to each other, wherein a lower pressing and feed roller of the at least two pressing and feed rollers is fixated at the support frame and an upper pressing and feed roller of the at least two pressing and feed rollers is pivotably supported at the support frame, and at least one drive unit with a transmission, wherein the at least two running rollers are configured for supporting the chassis on a base, wherein the upper pressing and feed roller and the lower pressing and feed roller are configured for passing the edges of the overlapping plastic material webs through between each other, wherein the at least one drive unit with the transmission is configured for driving the at least two pressing and feed rollers, wherein a longitudinal bending arm is arranged at the support frame and protrudes in a welding direction from the support frame, wherein the longitudinal bending arm is elastically deformable at least in a direction that is vertical in an operating position of the welding apparatus, wherein the longitudinal bending arm is fixated at the support frame with an end of the longitudinal bending arm that is oriented backward in the welding direction, wherein the heating device is fixated with a heating device section that is oriented backward in the welding direction at an end of the longitudinal bending arm that is oriented forward in the welding direction, wherein an actuation device for the longitudinal bending arm with the heating device is arranged at the support frame so that the actuation device facilitates bending the end of the longitudinal bending arm that is oriented forward in the welding direction downward, and wherein the actuation device impacts the longitudinal bending arm directly through an actuation lever or indirectly through the heating device so that the actuation device moves the longitudinal bending arm vertically downward in the operating position of the welding apparatus.

2. The welding apparatus according to claim 1, wherein the heating device extends the longitudinal bending arm in the welding direction.

3. The welding apparatus according to claim 1, wherein the longitudinal bending arm is arranged in a non-deformed condition at an acute upward angle relative to a running plane that is defined by the running rollers.

4. The welding apparatus according to claim 3, wherein the heating device is positionable in a center between the at least two opposite pressing and feed rollers by bending the longitudinal bending arm downward in the operating position of the welding apparatus, and wherein the heating device centers self-acting.

5. The welding apparatus according to claim 1, wherein the support frame includes a tensioning device for the upper pressing and feed roller, wherein the tensioning device is coupled with the actuation device for the longitudinal bending arm, and wherein the tensioning device presses the upper pressing and feed roller against the lower pressing and feed roller.

6. The welding apparatus according to claim 1, wherein the actuation lever includes at least one down holder bar for the longitudinal bending arm, and wherein the at least one down holder bar impacts at least one of the heating device and the longitudinal bending arm upon actuation of the actuation device and bends the longitudinal bending arm vertically downward in the operating position of the welding apparatus.

7. The welding apparatus according to claim 6, wherein the at least one down holder bar keeps an edge of the overlapping plastic material web away from the heating device when the at least two pressing and feed rollers are separated from each other.

8. The welding apparatus according to claim 6, wherein the at least one down holder bar or the at least one down holder roller is adjustable.

9. The welding apparatus according to claim 1, wherein the actuation lever includes at least one down holder roller for the longitudinal bending arm, and wherein the at least one down holder roller impacts the heating device upon actuation of the actuation device and bends the longitudinal bending arm vertically downward in the operating position of the welding apparatus.

10. The welding apparatus according to claim 9, wherein the at least one down holder roller presses the edges of the overlapping plastic material webs against the heating device when the overlapping plastic material webs are supported between the at least two pressing and feed rollers and the at least two pressing and feed rollers contact each other.

11. The welding apparatus according to claim 1, wherein the longitudinal bending arm is made from a spring elastic sheet metal blank.

12. The welding apparatus according to claim 1, wherein the longitudinal bending arm has a thickness of 0.3-3.0 mm.

13. The welding apparatus according to claim 1, wherein the heating device is a heating wedge.

* * * * *

UNITED STATES PATENT AND TRADEMARK OFFICE
CERTIFICATE OF CORRECTION

PATENT NO. : 10,052,816 B2
APPLICATION NO. : 15/436823
DATED : August 21, 2018
INVENTOR(S) : Flavio Sigrist Page 1 of 1

It is certified that error appears in the above-identified patent and that said Letters Patent is hereby corrected as shown below:

On the Title Page

Change the name of the Assignee to "LEISTER TECHNOLOGIES AG".

Foreign Application Priority date should be: March 24, 2016 (EP) 16401022.5

Signed and Sealed this
Ninth Day of October, 2018

Andrei Iancu
*Director of the United States Patent and Trademark Office*